US009830397B2

United States Patent
Sadovsky

(10) Patent No.: US 9,830,397 B2
(45) Date of Patent: Nov. 28, 2017

(54) METHOD AND COMPUTER-BASED SYSTEM FOR PROCESSING A SEARCH QUERY FROM A USER ASSOCIATED WITH AN ELECTRONIC DEVICE

(71) Applicant: YANDEX EUROPE AG, Luzern (CH)

(72) Inventor: Aleksandr Anatolievich Sadovsky, Moscow (RU)

(73) Assignee: YANDEX EUROPE AG, Luzern (CH)

( * ) Notice: Subject to any disclaimer, the term of this patent is extended or adjusted under 35 U.S.C. 154(b) by 0 days.

(21) Appl. No.: 15/510,766

(22) PCT Filed: Apr. 8, 2015

(86) PCT No.: PCT/IB2015/052548
§ 371 (c)(1),
(2) Date: Mar. 13, 2017

(87) PCT Pub. No.: WO2016/103056
PCT Pub. Date: Jun. 30, 2016

(65) Prior Publication Data
US 2017/0270130 A1    Sep. 21, 2017

(30) Foreign Application Priority Data
Dec. 25, 2014    (RU) ................................ 2014152870

(51) Int. Cl.
*G06F 17/30*     (2006.01)

(52) U.S. Cl.
CPC ...... *G06F 17/3087* (2013.01); *G06F 17/3053* (2013.01); *G06F 17/30554* (2013.01); *G06F 17/30867* (2013.01)

(58) Field of Classification Search
CPC .......... G06F 17/3087; G06F 17/30554; G06F 17/30867; G06F 17/3053
(Continued)

(56) References Cited

U.S. PATENT DOCUMENTS 7,533,079 B2    5/2009    Naito et al.
7,949,529 B2    5/2011    Weider et al.
(Continued)

FOREIGN PATENT DOCUMENTS

WO    2009151928 A2    12/2009

OTHER PUBLICATIONS

International Search Report from PCT/IB2015/052548, dated Jul. 22, 2015, Blaine Copenheaver.
(Continued)

*Primary Examiner* — Greta Robinson
(74) *Attorney, Agent, or Firm* — BCF LLP

(57) ABSTRACT

A computer-implemented method of and a server for processing a search query from a user associated with an electronic device, the method comprising receiving the search query; determining an indication associated with a geographical location associated with the user; determining an indication associated with a scenario, the scenario comprising data defining a sequence of events; generating a result set associated with the search query. Generating the result set comprises determining an indication associated with a first object of interest and an indication associated with a second object of interest based on an analysis of data associated with the first object of interest, the indication associated with the geographical location and the indication associated with the scenario. Generating the result set also comprises compiling the result set. The method also comprises triggering the electronic device to display the result set to the user.

20 Claims, 10 Drawing Sheets

(58) Field of Classification Search
USPC ....... 707/707, 708, 710, 805, 918, 919, 920, 707/921; 705/1.1, 6, 7.25, 7.26, 7.34, 13, 705/26.7, 26.8, 323; 701/491, 537
See application file for complete search history.

(56) References Cited

U.S. PATENT DOCUMENTS

| | | | |
|---|---|---|---|
| 8,024,314 B2 | 9/2011 | Wang et al. | |
| 8,311,973 B1 | 11/2012 | Zadeh | |
| 8,341,196 B2 | 12/2012 | Immonen et al. | |
| 8,370,323 B2 | 2/2013 | Gopalakrishnan | |
| 8,370,362 B2 | 2/2013 | Szabo | |
| 8,515,890 B2 | 8/2013 | Zadeh | |
| 8,583,579 B1 | 11/2013 | Seth et al. | |
| 8,880,559 B2* | 11/2014 | Bartell | G06F 17/3087 705/26.7 |
| 2001/0047239 A1 | 11/2001 | Kamiya et al. | |
| 2002/0188402 A1 | 12/2002 | Huang et al. | |
| 2003/0153330 A1* | 8/2003 | Naghian | G01C 21/00 455/456.1 |
| 2005/0033616 A1 | 2/2005 | Vavul et al. | |
| 2006/0123014 A1 | 6/2006 | Ng | |
| 2007/0106468 A1 | 5/2007 | Eichenbaum et al. | |
| 2008/0021748 A1 | 1/2008 | Bay et al. | |
| 2008/0294650 A1* | 11/2008 | Karlsson | G06F 17/30041 |
| 2009/0222440 A1 | 9/2009 | Hantke et al. | |
| 2010/0241507 A1 | 9/2010 | Quinn et al. | |
| 2010/0332493 A1 | 12/2010 | Haas et al. | |
| 2011/0010241 A1* | 1/2011 | Mays | G01C 21/36 705/14.49 |
| 2011/0125743 A1 | 5/2011 | Immonen et al. | |
| 2011/0213787 A1 | 9/2011 | Cerny | |
| 2011/0258148 A1 | 10/2011 | Gao et al. | |
| 2011/0314382 A1 | 12/2011 | Sweeney | |
| 2011/0320441 A1 | 12/2011 | Lee et al. | |
| 2013/0097053 A1 | 4/2013 | Lee et al. | |
| 2013/0232006 A1 | 9/2013 | Holcomb et al. | |
| 2013/0325839 A1 | 12/2013 | Goddard et al. | |
| 2014/0201126 A1 | 7/2014 | Zadeh et al. | |
| 2014/0219566 A1 | 8/2014 | Rodriguez et al. | |
| 2014/0229102 A1 | 8/2014 | Bapna et al. | |
| 2016/0171011 A1* | 6/2016 | Drogobetski | G06F 17/30241 707/722 |

OTHER PUBLICATIONS

International Preliminary Report on Patentability from PCT/IB2015/052548, dated Feb. 4, 2016, Naeem Haq.

* cited by examiner

STATE BODIES

PASSPORT OFFICE
REGISTRATION OF A FOREIGNER
INTERNATIONAL PASSPORT

3, SOSEDNYAYA STREET

TEL: 123-7890 - QUESTION 1
TEL: 231-7890 - QUESTION 2
WORKING HOURS: MONDAY
TO FRIDAY: 9 A.M. - 8 P.M.,
SATURDAY: 10 A.M. - 3 P.M.
SITE
⎬ 704

POLICE CENTRE
MORE...>

5, SOSEDNYAYA STREET
TEL: 000-0000

TWENTY-FOUR-HOUR

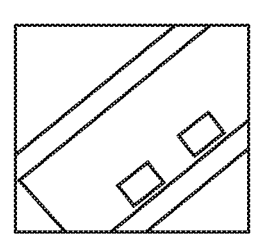

GROCERY
• "CONVENIENCE STORE"

8, (NAME) STREET TEL: 128-1313

• "CARREFOUR"

6, (NAME) STREET TEL: 529-1111
⎬ 706

PHARMACIES
• 36,6
• Асна
MORE... >

(NAME) STREET
(NAME) STREET

*FIG. 8*

EMERGENCY

BREAK-IN                          Tel: 123-9876

AMBULANCE                         Tel: 01
• AMBULANCE SERVICE FOR           Tel: 325-0000
CHILDREN
• TRAUMA UNIT                     4, SOSEDNYAYA STREET
                                  TEL: 890-3234

WATER FLOOD FROM NEIGHBORS        TEL: 999-0000
• CALL A PLUMBER                  TEL: 123-9909
• ASSESSING THE DAMAGE (BY
THE PUBLIC UTILITIES SERVICE)

708

METHOD AND COMPUTER-BASED SYSTEM FOR PROCESSING A SEARCH QUERY FROM A USER ASSOCIATED WITH AN ELECTRONIC DEVICE

CROSS-REFERENCE

The present application claims priority to Russian Patent Application No. 2014152870, filed Dec. 25, 2014, entitled "METHOD AND COMPUTER-BASED SYSTEM FOR PROCESSING A SEARCH QUERY FROM A USER ASSOCIATED WITH AN ELECTRONIC DEVICE" the entirety of which is incorporated herein.

FIELD

The present technology relates to computer-based systems and methods for processing a search query from a user associated with an electronic device. In particular, the systems and methods aim at generating a result set based on an analysis of a first and a second objects of interest, an indication associated with a geographical location and an indication associated with a scenario.

BACKGROUND

In various instances, a user will rely on her/his electronic device to search for information associated with a particular context or a particular situation she/he may face. Such particular context or situation may include, for example, a change in a place of residence, a business trip, a vacation trip, an administrative procedure to be undertaken, a visit of an area of interest or a visit of a site of interest. As current search engines such as Yandex™ or Google™ allow searching multiple kind of information from multiple information sources through the electronic device of the user, the user, upon facing a particular context or situation, typically undertakes an iterative process consisting of running multiple queries in one or more search engines. As a result, the user obtains various results pages each containing many objects of interest that may be or may not be relevant to the particular context or situation of the user. In some instances, the user may then wish to compile the information in the form of a list that may contain a sequence of objects of interests. For example, if the user is on a business trip, he may wish to obtain a list of locations which are relevant to her/his particular context, for example a list of hotels, pharmacies, banks and metro stations located in a vicinity of a place where she/he undertakes a business meeting. The list may further be manually ordered by the user according to specific parameters, such as, for example, hours of opening or closing, distance from a determined geographical location, etc.

Even though mobile devices and, more particularly search engines accessible through mobile devices, facilitate the manual creation of a list of objects of interests according to a particular context or situation, the multiple manual iterations required render the process cumbersome for the user, in many instances lead to inaccurate results, and often result in an increased data usage due to the numerous search queries required to be run by the user. Such data usage not only increases network traffic unnecessarily but may also, especially when the user is on a data roaming usage mode, unnecessarily increases costs to the user.

Some solutions, for certain limited contexts, such as, for example, for vacation trips planning, have been developed. Such solutions include the method and system detailed in US Publication 2014/0229102 where selected information is provided to a traveler to decide on what places to go and what activities to do. Even though a certain level of automation in the planning of a trip may be obtained, the method and system described are specific to the context of a vacation trip and does not address the problem of automation of a list of objects of interest according to various specifics of an object of interest and, more importantly, according to scenarios not relating to vacation trips.

SUMMARY

It is an object of present technology to provide improvements, in particular improvements aiming at, as a result of a query received from an electronic device of a user, generating a result set compiling a list of objects that are relevant to a particular context or situation of the user.

In some applications, it is desirable to compile a list of objects that are relevant to a particular context or situation of the user. For example, a user on a business trip may wish to obtain a list of locations that are relevant to her/his particular context of a business trip, in a particular geographical location. The problem of compiling list of objects determined to be relevant to particular contexts or situations may be prevalent in an environment where large amount of data or parameters associated with objects of interest are available to the user and where the user has access to a virtually unlimited number of information sources from which to search objects of interest.

The present technology arises from an observation made by the inventor(s) that upon receiving a query from a user, a geographical location associated with the user and a scenario associated with the user may be determined. Once determined, the geographical location and the scenario may be used in combination with data associated with objects of interest to determine objects of interests relevant to the particular context or situation of the user. The objects of interests determined to be relevant to the particular context or situation of the user may then be compiled in the form of a result set that may then be displayed on an electronic device associated with the user. The present technology therefore allows a user to send a single or a limited number of search queries to obtain aggregated information relating to her/his particular context or situation. As a result, the present technology, allows, inter alia, to ease the generation of a result set comprising objects of interest relevant to the particular context or situation of the user, facilitate the user experience with the search engine and limit the usage of data resulting from numerous manual search queries that the user would have otherwise had to run herself/himself.

Thus, in one aspect, various implementations of the present technology provide computer-implemented method of processing a search query from a user associated with an electronic device, the method executable at a server coupled to the electronic device via a communication network, the method comprising:

receiving, from the electronic device, via the communication network, the search query;
    determining, by a processor of the server, an indication associated with a geographical location associated with the user;
    determining, by the processor of the server, an indication associated with a scenario, the scenario comprising data defining a sequence of events;
    generating a result set associated with the search query by executing:

determining, by the processor of the server, an indication associated with a first object of interest based on an analysis of data associated with the first object of interest, the indication associated with the geographical location and the indication associated with the scenario;

determining, by the processor of the server, an indication associated with a second object of interest based on an analysis of data associated with the second object of interest, the indication associated with the geographical location and the indication associated with the scenario;

compiling, by the processor of the server, the result set, the result set comprising the indication of the first object of interest and the indication of the second object of interest;

storing, in a non-transitory computer-readable medium accessible by the server, the result set; and triggering the electronic device to display the result set to the user.

In some implementations, the method further comprises, prior to the triggering the electronic device to display the result set to the user:

transmitting, to the electronic device, via the communication network, the result set.

In some further implementations of any one of the above-recited aspects, the data associated with the first object of interest and the data associated with the second object of interest is retrieved from an object of interest database accessible by the server, the object of interest database aggregating data obtained from distinct Internet resources.

In some implementations of any one of the above-recited aspects, the method further comprises, prior to determining, by the processor of the server, the indication associated with the first object of interest:

aggregating data associated with the first object of interest, the data being obtained from distinct Internet resources.

In some further implementations of any one of the above-recited aspects, the method comprises, prior to the generating of the result set associated with the search query:

associating the data defining the sequence of events with the data associated with the first object of interest and the data associated with the second object of interest.

In some implementations of any one of the above-recited aspects, associating the data defining the sequence of events with the indication associated with the first object of interest and the indication associated with the second object of interest is based on the data associated with the first object of interest and the data associated with the second object of interest.

In some further implementations of any one of the above-recited aspects, the data defining the sequence of events comprises one of an indication of a change of residence location, an indication of an administrative procedure, an indication of a vacation trip, an indication of a business trip, an indication of a visit of an area of interest and an indication of a visit at an object of interest.

In some implementations of any one of the above-recited aspects, determining the indication associated with the scenario is based on at least one of the indication associated with the geographical location associated with the user, data associated with a user profile, search queries, the search query and data received from the electronic device.

In some further implementations of any one of the above-recited aspects, determining the indication associated with the scenario comprises at least one of analysing the search query, analysing a scenario selection made by the user, retrieving the data defining the sequence of events from a scenario database accessible by the server and accessing data associated with a user profile from a user profile database accessible by the server.

In some implementations of any one of the above-recited aspects, determining the indication associated with the scenario comprises selecting, by the processor of the server, a sequence of events amongst a plurality of pre-established sequence of events.

In some further implementations of any one of the above-recited aspects, compiling the result set comprises executing an ordering routine to sequentially order the indication associated with the first object of interest and the indication associated with the second object of interest.

In some implementations of any one of the above-recited aspects, the ordering routine to sequentially order the indication associated with the first object of interest and the indication associated with the second object of interest is based on at least one of the indication associated with the geographical location associated with the user, the data defining the sequence of events, the data associated with the first object of interest, the data associated with the second object of interest, data associated with a user profile, data associated with an age of the user, data associated with a gender of the user, the search query and data received from the electronic device.

In some further implementations of any one of the above-recited aspects, each of the data associated with the first object of interest and the data associated with the second object of interest is associated with at least one of an indication of an area of interest, an indication of a location of interest, an indication of a place of business, an indication of a place of service, an indication of a transport organization, an indication of an hour of opening, an indication of an hour of closing, an indication of an accessibility for a person with reduced mobility, an indication of a visit order, an indication of a geographical location, an indication of a transportation service and an indication of a cost.

In some implementations of any one of the above-recited aspects, triggering the electronic device to display the result set to the user comprises causing the display of the electronic device to present one of a list of objects of interest and a list of actions associated with objects of interest.

In some further implementations of any one of the above-recited aspects, causing the display of the electronic device to present one of the list of objects of interest and the list of actions associated with objects of interest further comprises causing the display of the electronic device to present at least one of information associated with the objects of interest and information describing the actions associated with the objects of interest.

In some implementations of any one of the above-recited aspects, the geographical location is one of a current location of the user and a desired location selected by the user.

In some further implementations of any one of the above-recited aspects, the search query is received as a result of the electronic device determining a change of a user geographical location.

In some implementations of any one of the above-recited aspects, the triggering of the electronic device to display the result set to the user includes generating one of a search engine results page including the result set and an object card including the result set.

In some further implementations of any one of the above-recited aspects, the generating of the result set associated with the search query further comprises at least one of:

determining, by the processor of the server, the indication associated with the first object of interest at least partially based on one of a user feedback on a previously transmitted result set and an object of interest selected by the user; and determining, by the processor of the server, the indication associated with the second object of interest at least partially based on one of a user feedback on a previously transmitted result set and an object of interest selected by the user.

In other aspects, various implementations of the present technology provide a non-transitory computer-readable medium storing program instructions for processing a search query from a user associated with an electronic device, the program instructions being executable by a processor of a computer-based system to carry out one or more of the above-recited methods.

In other aspects, various implementations of the present technology provide a computer-based system, such as, for example, but without being limitative, a server comprising at least one processor and a memory storing program instructions for processing a search query from a user associated with an electronic device, the program instructions being executable by one or more processors of a computer-based system to carry out one or more of the above-recited methods.

In the context of the present specification, unless expressly provided otherwise, an "electronic device", a "user device", a "server", a "computer-based system" and "a web service system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 7 to 9 are screenshots illustrating the display of the result set generated in accordance with the computer-implemented method of FIG. 6.

Figure 1:
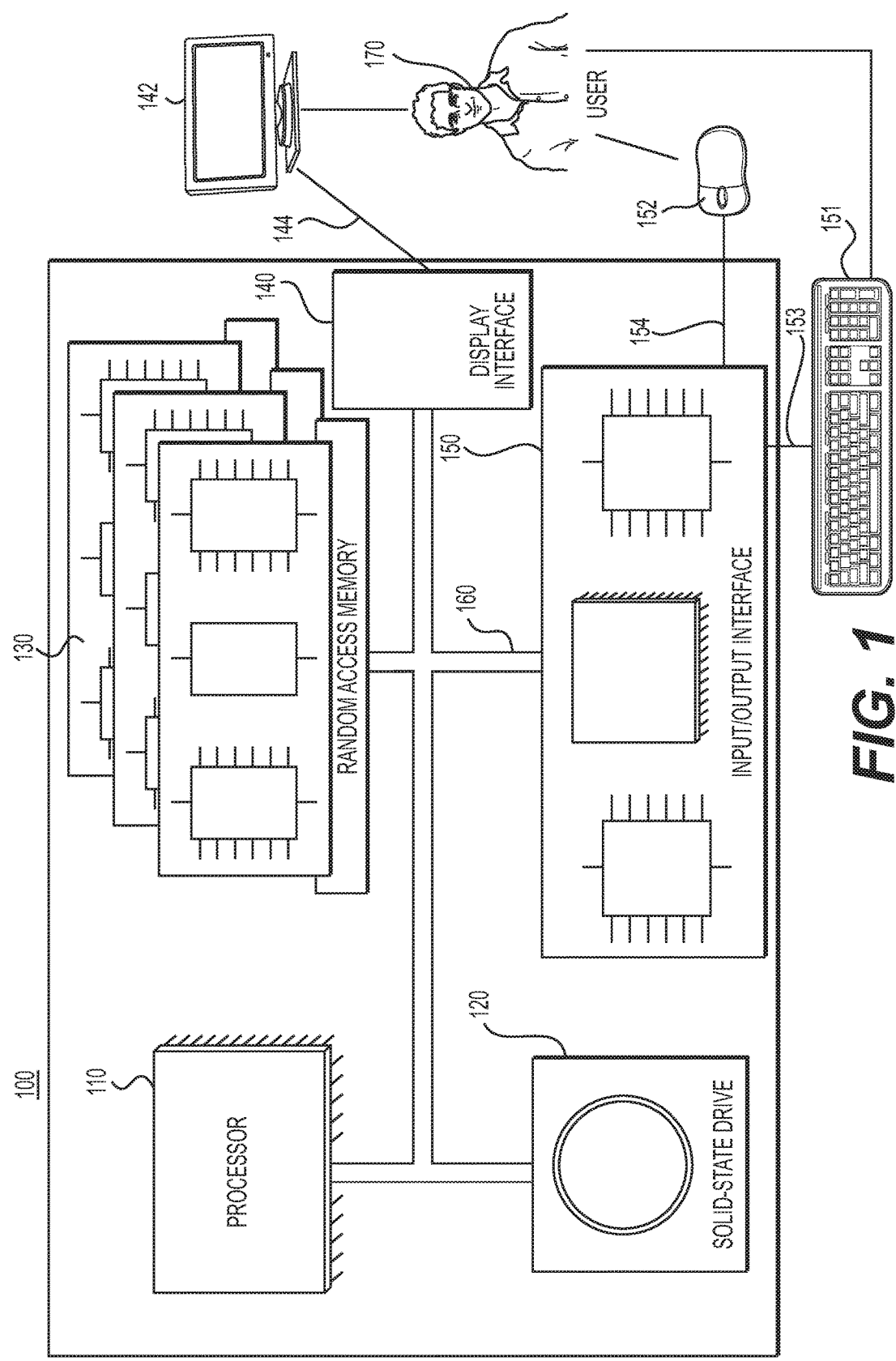
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 for processing a search query from a user associated with an electronic device. For example, the program instructions may be part of a library or an application.

Figure 2:
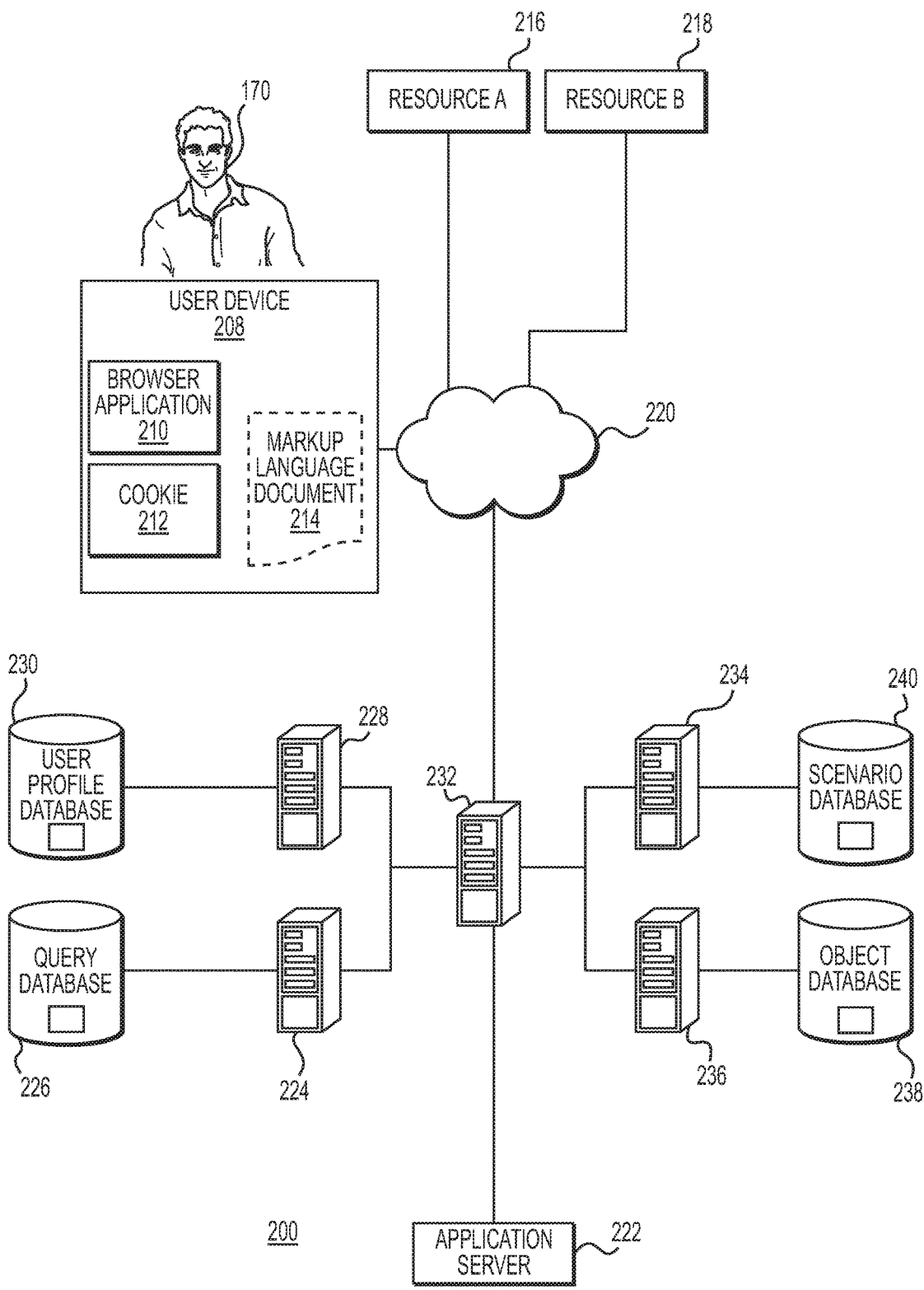
FIG. 2 is a diagram of a networked computing environment suitable for use with some implementations of the present technology.

In FIG. 2, there is shown a networked computing environment 200 suitable for use with some implementations of the present technology, the networked computing environment 200 comprising a user device 208 (also referred to as a "client device", an "electronic device" or an "electronic device associated with the user"), a resource A 216, a resource B 218, an application server 222 associated with a server 232, a query database 226 associated with a server 224, a user profile database 230 associated with a server 228, an object database 238 associated with a server 236, a scenario database 240 associated with a server 234 as well as a network 220 enabling these systems to communicate.

The implementation of the user device 208 is not particularly limited, but as an example, the user device 208 may interact with the application server 222 by receiving input from the user 170 and receiving and transmitting data via the network 220. The user device 208 may be, for example and without being limitative, a desktop computer, a laptop computer, a smart phone (e.g. an Apple iPhone™ or a Samsung Galaxy S5™), a personal digital assistant (PDA) or any other device including computing functionality and data communication capabilities. The user device 208 may comprise internal hardware components including one or more single or multi-core processors collectively referred to herein as processor 110, and a random access memory 130, each of which is analogous to the like-numbered hardware components of computer system 100 shown in FIG. 1, as well as a network interface (not depicted) for communicating with the application server 222. The user device 208 may also comprise a GPS receiver (not depicted) for receiving a GPS signal from one or more GPS satellites, such as the satellite 500 of FIG. 5.

In one embodiment, the user device 208 displays content from application server 222 by processing a markup language document 214 received from the application server 222. The markup language document 214 identifies content and one or more instructions describing formatting or presentation of the content. By executing the instructions included in the markup language document 214, a browser application 210 displays the identified content using the format or presentation described by the markup language document 214. In various embodiments, the markup language document 214 comprises a data file including extensible markup language (XML) data, extensible hypertext markup language (XHTML) data or other markup language data. In various embodiments, the user device 208 executes a search interface through the browser application 210 and/or through a dedicated search application (not shown) preinstalled on the user device 208. Generally speaking, the purpose of the search interface is to enable the user 170 to formulate a search query and execute a search using a search engine that is, in an exemplary embodiment, hosted on the application server 222. To that end, the search interface may comprise a query interface (not shown) in which the user 170 may formulate a search query by interacting, for example, with the touchscreen of the user device 208. The search interface may also comprise a search results interface (not shown) to display a result set generated further to the processing of the search query.

How the search application is implemented is not particularly limited. One example of the search application may be embodied in a user accessing a web site associated with a search engine to access the application server 222. For example, the search application can be accessed by typing in an URL associated with Yandex search engine at www.yandex.ru. It should be expressly understood that the search application can be accessed using any other commercially available or proprietary search engine.

In other embodiments, the user device 208 may also include a cookie 212 that contains data indicating whether the user 170 of the user device 208 is logged into the application server 222. The cookie 212 may indicate whether the user 170 is involved in an active session where the user device 208 exchanges data with the application server 222, providing that the user 170 has an account associated with the application server 222.

The user device 208 is coupled to the network 220 via a communication link (not numbered). In some non-limiting embodiments of the present technology, the network can be implemented as the Internet. In other embodiments of the present technology, the network 220 can be implemented differently, such as any wide-area communications network, local-area communications network, a private communications network and the like.

How the communication link is implemented is not particularly limited and will depend on how the user device 208 is implemented. Merely as an example and not as a limitation, in those embodiments of the present technology where the user device 208 is implemented as a wireless communication device (such as a smart-phone), the communication link can be implemented as a wireless communication link (such as but not limited to, a 3G communications network link, a 4G communications network link, a Wireless Fidelity, or WiFi®, Bluetooth® and the like). In those examples, where the user device 208 is implemented as a notebook computer, the communication link can be either wireless (such as the Wireless Fidelity, or WiFi®, Bluetooth® and the like) or wired (such as an Ethernet based connection).

It should be expressly understood that implementations for the user device 208, the communication link and the network 220 are provided for illustration purposes only. As such, those skilled in the art will easily appreciate other specific implementational details for the user device 208, the communication link and the network 220. As such, by no means, examples provided herein above are meant to limit the scope of the present technology.

Also coupled to the network 220 is the server 232 on which the application server 222 may be hosted. The server 232 can be implemented as a conventional computer server. In an example of an embodiment of the present technology, the server 232 can be implemented as a Dell™ PowerEdge™ Server running the Microsoft™ Windows Server™ operating system. Needless to say, the server 232 can be implemented in any other suitable hardware and/or software and/or firmware or a combination thereof. In the depicted non-limiting embodiment of present technology, the server 232 is a single server. In alternative non-limiting embodiments of the present technology, the functionality of the server 232 may be distributed and may be implemented via multiple servers.

The implementation of the server 232 is well known to the person skilled in the art of the present technology. However, briefly speaking, the server 232 comprises a communication interface (not depicted) structured and configured to communicate with various entities (such as the user device 208, for example and other devices potentially coupled to the network 220) via the network 220. The server 232 further comprises at least one computer processor (not depicted) operationally connected with the communication interface and structured and configured to execute various processes to be described herein.

The server 232 is communicatively coupled (or otherwise has access) to the application server 222 implementing a search engine in accordance with some implementations of the present technology. As such, the server 232 can be sometimes referred to as a "search server" or a "search front-end server". Even though the application server 222 is depicted as a separate server from the server 232, in some embodiments, the functionality of the application server 222 can be implemented by the server 232. In alternative non-limiting embodiments of the present technology, the functionality of the application server 222 may be distributed and may be implemented via multiple servers.

The general purpose of the application server 222 is to perform searches in response to the user queries inputted via, for example, the user device 208 and to output search results, for example in the form of a result set, to be presented to the user using a search results interface. What follows is a description of one non-limiting embodiment of the implementation for the application server 222. However, it should be understood that there is a number of alternative non-limiting implementations of the application server 222 possible. It should be also expressly understood that in order to simplify the description presented herein below, the configuration of the application server 222 has been greatly simplified. It is believed that those skilled in the art will be able to appreciate implementational details for the application server 222 and for components thereof that may have been omitted for the purposes of simplification of the description.

Generally speaking the purpose of the application server 222 is to (i) receive a search query from the user device 208; (ii) determine an indication associated with a geographical location associated with the user 170; (iii) determine an indication associated with a scenario reflecting a particular context or situation of the user; (iv) generate a result set comprising an indication of a first object of interest and an indication of a second object of interest; and (v) trigger a display of the result set on the user device 208. How the application server 222 is configured to execute searches is not particularly limited. Those skilled in the art will appreciate several ways and means to execute the search using the application server 222 and as such, several structural components of the application server 222 will only be described at a high level.

The application server 222 has access to multiple resources via the network 220. The multiples resources may be, in a non-limiting example, resource A 216 and resource B 218 both coupled to the application server 222 via the network 220. Each of the resource A 216 and the resource B 218 is representative of a network resource accessible (by either, some or all of: the user device 208, the servers 224, 228, 234 and 236) through the network 220 and maintaining certain information.

Just as examples, the resource A 216 can be a web resource hosting the WIKIPEDIA™ ("The Free Encyclopedia") web resource, accessible for example at the following URL: www.wikipedia.org. Just as another example, the resource B 218 can be a web resource hosting the YP™ ("Yellow Pages") web resource, accessible for example at the following URL: www.yellowpages.com. It should be expressly understood that the resource A 216 and the resource B 218 can be implemented differently and that a number of additional web resources (similar or different to the examples of the resource A 216 and the resource B 218 provided above) can be present within alternative implementations of the system 200.

The server 224 is communicatively coupled (or otherwise has access) to the query database 226 implementing a database accessible by the application server 222, in accordance with some exemplary implementations of the present invention. The query database 226 may comprise one or more collections of data relating to search queries that the user or other users have previously run on the application server 222. In an exemplary embodiment of the present invention, the application server 222 may access search queries that the user has previously run by (i) determining the user profile by accessing the user profile database 230; and (ii) based on the determined user profile, retrieving search queries previously run by the user on the application server 222. The search queries previously run by the application server 222 may then be used for the purpose of generating a result set relevant to the user situation or context. For example, the application server 222 may use, at least partially, the search queries previously run by the user to determine the geographical location and/or the scenario reflecting the situation or context of the user that is then used to generate the result set.

The server 228 is communicatively coupled (or otherwise has access) to the user profile database 230 implementing a database accessible by the application server 222, in accordance with some exemplary implementations of the present invention. The user profile database contains data structures with fields suitable for describing a user's profile. In an exemplary embodiment, when a new user's profile is created, the application server 222 initializes a new data structure of the corresponding type, assigns a unique object identifier to it, and begins to add data to the user's profile as needed. This might occur, for example, when a user becomes a user of the application server 222, the application server 222 generates a new instance of a user profile in the user profile database 230, assigns a unique identifier to the user profile, a password associated with the unique identifier, and begins to populate the fields of the user profile with information provided by the user. As previously recited above in connection with the query database 226, the application server 222 may access the query database 226 to retrieve search queries previously run by the user on the application server 222. The search queries previously run by the application server 222 may then be used for the purpose of generating a result set relevant to the user situation or context. For example, the application server 222 may use, at least partially, the search queries previously run by the user to determine the geographical location and/or the scenario reflecting the situation or context of the user that is then used to generate the result set. In another exemplary embodiment, the application server 222 may access a user's profile and may use, at least partially, data associated with the user's profile to determine the geographical location and/or the scenario reflecting the situation or context of the user that is then used to generate the result set.

Figure 3:
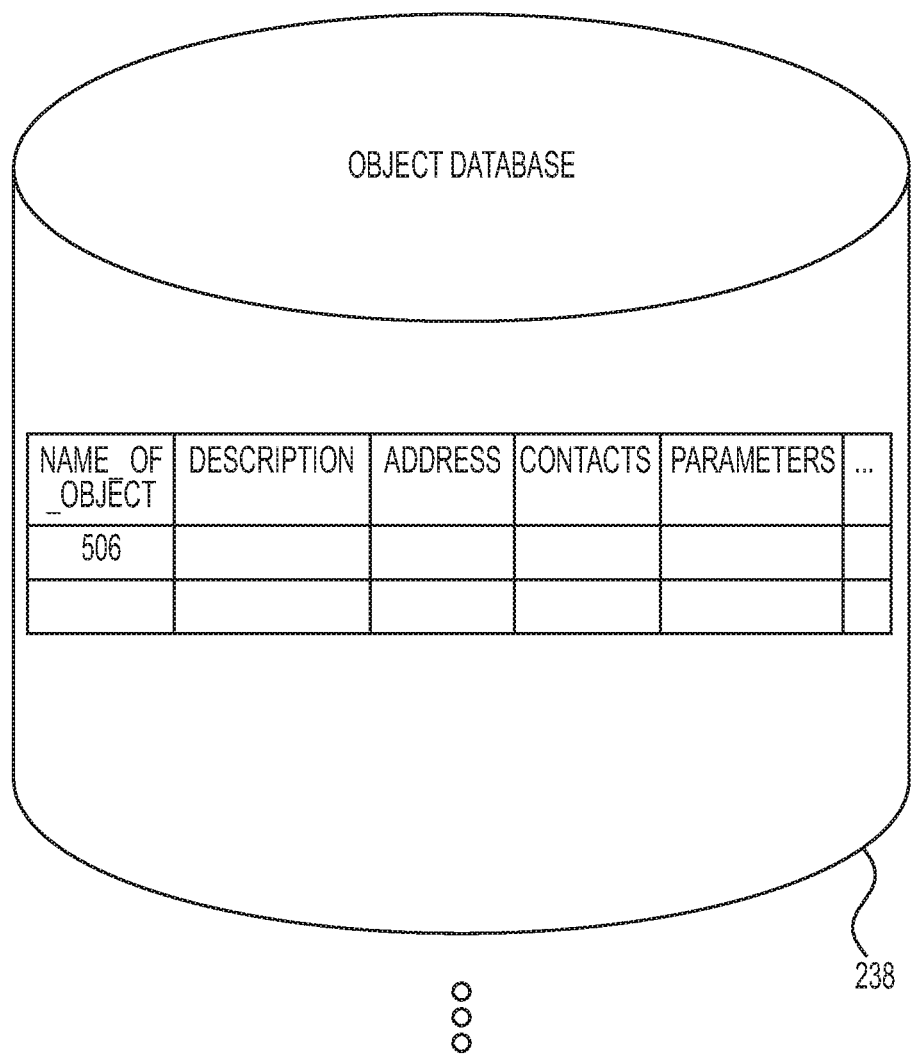
FIG. 3 is a diagram of an object database for use with some implementations of the present technology.

The server 228 is communicatively coupled (or otherwise has access) to the object database 238 implementing a database accessible by the application server 222, in accordance with some exemplary implementations of the present technology. In an exemplary embodiment, the object database 238 aggregates data obtained from distinct Internet resources, such as, for example, the resource A 216 and the resource B 218. The object database 238 contains data structures with fields suitable for describing objects (also referred to as "objects of interest"). An example of data structure that may be contained by the object database is depicted in FIG. 3 wherein an object 506 is shown. The data structure shown in FIG. 3 comprises the following fields "name of object", "description", "address", "contacts" and "parameters". In other embodiments, the data structure may include more or less fields without departing from the scope of the present technology.

In an exemplary embodiment, the name of object may be a name identifying, an identifier or a pointer to an identifier, such as an indication, of the object. In an embodiment of the present technology, the name of object is a unique identifier uniquely identifying the object 506 in the object database 238. In an example wherein the object 506 would relate to a museum, such as the "State Hermitage Museum", the field name of object of the object 506 may be populated with a chain of character "State Hermitage Museum".

In yet the same example, the description field may be a chain of character and/or a media file (such as an audio file, a picture file, a video file . . . ), or a pointer to a chain of character and/or a media file. In the example wherein the object 506 would relate to the "State Hermitage Museum", the description field may contain certain information relating to the museum, such as its founding, a description of the museum complex, etc.

In yet the same example, the address field may be a chain of characters or a pointer to a chain of character or other data allowing identifying an address associated with the object 506. In the example wherein the object 506 would relate to the "State Hermitage Museum", the address field may be populated with the following chain of character, "The State Hermitage Museum, Russia, 190000, St Petersburg, Dvortsovaya Naberezhnaya 34".

In yet the same example, the contacts field may be a chain of character or a pointer to a chain of characters or other data relating to contacts information associated with the object 506. In the example wherein the object 506 would relate to the "State Hermitage Museum", the contacts field may be populated with the following chain of character "Contact information: Phone: +7 (812) 710-95-10; Fax: +7 (812) 312-15-67; E-mail: press@hermitage.ru".

In yet the same example, the parameters field may be a chain of character or a pointer to a chain of characters or other data relating to information associated with the object 506. In other examples, the parameters field may be a collection of parameters each comprising a chain of character or a pointer to a chain of characters or other data relating to information associated with the object 506. In some exemplary embodiments of the present technology, the parameters field may include a type of objects (for example, museum, shop, cafe, office, etc.), geographical coordinates (in addition to or as a replacement of the address field), an indication that the object 506 is part of a set of services, an indication of working days and hours associated with the object 506, an indication of a cost of a service associated with the object 506, an indication of a gender restriction associated with the object 506, an indication of an age restriction associated with the object 506, an indication of an accessibility for a person with reduced mobility associated with the object 506, an indication of a map associated with the object 506; and an indication of a website associated with the object 506.

It should be understood that this list is not exhaustive and that other type of parameters may be included without departing from the scope of the present technology. In addition, the parameters field may include one or more groups of parameters grouping parameters according to a common pattern. For example, a first group of parameters "social" may group an indication of working days and hours and an indication of a gender restriction. A second group of parameters "geographic" may group an address and GPS coordinates. Other variations are also possible without departing from the scope of the present technology. In the example wherein the object 506 would relate to the "State Hermitage Museum", the parameters field may be populated with an indication of working days and hours associated with the object 506 such as "Opening hours/Tuesday, Thursday-Sunday: 10:30-18:00; Wednesday: 10:30-21:00". In the example wherein the object 506 would relate to the "State Hermitage Museum", the parameters field may be populated with an indication of an age restriction.

As it will be understood by a person skilled in the art of the present technology, multiple kinds of objects and/or objects having various natures may populate the database 238 without departing from the scope of the present technology. For example, but without being limitative, the object 506 may relate to a site of interest, an area of interest, a location of interest, a service, a place of service, a transport organization, a service organization, etc. Examples of objects may include an organization, a company, a cinema, a cafe, a post office, a bank, a public infrastructure, etc.

In addition, the parameters field of the object 506 may include an indication of an order identifying a particular position in a sequence of events associated with the object 506. The indication of the order may be used by the application server 222 upon compiling and/or ordering objects to be presented to the user 170. In an example, the object 506 is associated with a passport office. In this example, the parameters field of the object 506 may include an indication of an order reflecting the position of the object 506 in a sequence of events associated with an application for a passport. In this example, the indication of the order will allow the application server 222 to determine that the object 506 is to be ordered in a list in position after an object associated with a place where the user 170 may take a picture to be used in her/his application for passport. It should however be understood that the indication of an order is an example of how the application server 222 may determine the order of a position of an object in a list compared to a position of another object in the same list. For example, the application server 222 may rely on the indication of working days and hours associated with the object 506 to determine that the object 506 should be positioned in a list before or after another object associated with an indication of working days and hours.

For example, the application server 222 may determine that an object associated with a pharmacy is to be positioned before another object associated with a post office because the application server 222 determined that the pharmacy closes prior to the post office. Other variations are possible, such as, but without being limitative, allowing the application server 222 to rely on an indication of an age restriction and/or a gender restriction to compile and/or order an object compared to another object in a list to be presented to the user 170. In yet other variations, the parameters field may be associated with a scenario that defines a sequence of events and reflect a particular context or situation associated with the user 170. Broadly speaking, the present technology may rely on one or more parameters of an object to compile and/or order a result set comprising a first and a second objects comprising, for example, but without being limitative, the one or more parameters set forth above.

Among the various benefits that the object database 238 may provide to the user 170 and that will become apparent to the person skilled in the present technology, it should be pointed out that the user 170 does no longer need to know the name associated with an object prior to formulating a search query. In an exemplary embodiment, the application server 222 may identify one or more objects relevant to the user context or situation based on certain parameters associated with the one or more objects.

According to some embodiments of the present invention, the object database 238 may be populated prior to a search query being received by the application server 222, for example, but without being limitative, the object database 238 may be populated by the server 236 from the resource A 216 and/or the resource B 218. In other embodiments, the object database 238 may be populated, at least partially upon receipt of a search query. In yet other embodiments, the application server 222 may directly aggregate data from various Internet resources without having to access the object database 238.

Figure 4:
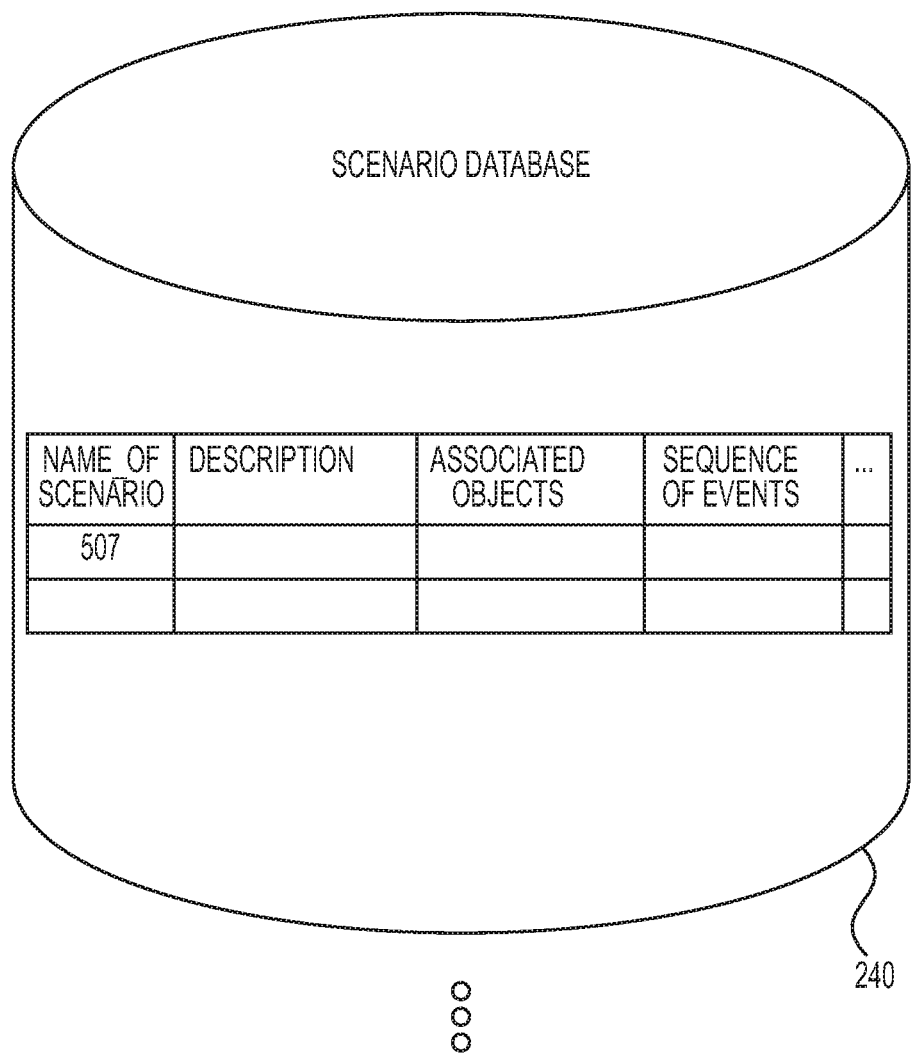
FIG. 4 is a diagram of a scenario database for use with some implementations of the present technology.

The server 234 is communicatively coupled (or otherwise has access) to the scenario database 240 implementing a database accessible by the application server 222, in accordance with some exemplary implementations of the present technology. The scenario database 240 contains data structures with fields suitable for describing scenarios. Broadly speaking, a scenario may be associated with a context or a situation the user 170 is facing and comprises data defining a sequence of events. As a result, the present technology may generate a result set comprising objects relevant to the user's context or situation based on an associated scenario. For example, a result set directed to a same user will vary whether the selected scenario is directed to a "business trip" or a "vacation trip". Other examples of scenario may include a "change of residence location", an "administrative procedure", a "visit of an area of interest", a "visit of a site of interest", etc. An example of data structure that may be contained by the scenario database is depicted in FIG. 4 wherein an object 507 is shown. The data structure shown in FIG. 4 comprises the following fields "name of scenario", "description", "associated objects" and "sequence of events". In other embodiments, the data structure may include more or less fields without departing from the scope of the present technology.

In an exemplary embodiment, the name of scenario may be a name identifying, an identifier or a pointer to an identifier, such as an indication, of the scenario. In an embodiment of the present technology, the name of scenario is a unique identifier uniquely identifying the scenario 507 in the scenario database 240. In an example wherein the scenario 507 would relate to a business trip, the field name of scenario of the scenario 507 may be populated with a chain of character "Business Trip".

In yet the same example, the description field may be a chain of character and/or a pointer to a chain of character. In the example wherein the scenario 507 would relate to the "Business Trip", the description field may contain certain information relating to the business trip, such as its duration, a more specific purpose, etc.

In yet the same example, the associated objects field may comprise data or a pointer to data associating a particular scenario with one or more objects, such as, for example, objects of the object database 238. In the example wherein the scenario 507 would relate to a "Business Trip", the associated objects field may comprise one or more pointers to the following objects: "cafe", "bank", "laundry" and "transport organization". In another example wherein the scenario 507 would relate to "changing place of residence", the associated objects field may comprise one or more pointers to the following objects: "shop", "cafe", "pharmacy" and "hairdresser".

In yet the same example, the sequence of events field may comprise data identifying an order that may be used by the application server 222 upon compiling and/or ordering objects to be presented to the user 170. The sequence of events field may allow the application server 222 to determine the order of a position of an object in a list compared to a position of another object in the same list. A scenario of the scenario database may be associated with a sequence of events. As a result, the sequence of events may differ from one scenario to another. For example, a sequence of events associated with a "Business Trip-Long Term" may differ from a sequence of events associated with a "Business Trip-Short Term". It should also be noted, that in some implementations of the present technology, the sequence of events may not reflect a particular order in real-life but rather the position of an object in a list compared to a position of another object in the same list. For example, in a sequence of events associated with a scenario "Change of Residence" may specify that an object "hospital" has to be positioned prior to an object "post office" in the list, even though the user 170 may first desire to go to the post office rather than to the hospital. This could be to reflect that the information associated with the object "hospital" may be more important than the information associated with the object "post office". In this example, the sequence of events may reflect a priority of an object with respect to another object rather than a particular order that the user 170 will or should follow in real-life.

As it should be understood by the person skilled in the art, the scenario database 240 may also comprise additional fields and/or parameters, such as for example, a field associated with a qualification of the scenario such as "Long Term" or "Short Term". Broadly speaking, the present technology may rely on one or more parameters of a scenario to compile and/or order a result set comprising a first and a second objects comprising, for example, but without being limitative, the one or more fields set forth above.

A scenario of the scenario database 240 may be or may not be used by the application server 222 in association with objects of the object database 238 to generate the result set comprising objects that are relevant to the user situation or context. The scenario may be selected by the user 170 or may be automatically or partially automatically determined by the application server 222. For examples wherein the scenario is automatically or partially automatically determined by the application server 222, the scenario may be selected by the application server 222 based on a geographical location associated with the user 170, data associated with a user profile (for example, a user profile retrieved from the user profile database 230), the search query received from the user device 208 and/or other data received form the user device 208.

Among the various benefits that the scenario database 240 may provide to the user 170 and that will become apparent to the person skilled in the present technology, it should be pointed out that the user 170 does no longer need to know the name associated with an object prior to formulating a search query. In an exemplary embodiment, the application server 222 may identify one or more objects relevant to the user context or situation based on certain parameters associated with a scenario.

According to some embodiments of the present invention, the scenario database 240 may be populated prior to a search query being received by the application server 222, for example, but without being limitative, the scenario database 240 may be populated by the server 234. In other embodiments, the scenario database 240 may be populated, at least partially upon receipt of a search query. In yet other embodiments, the application server 222 may generate a scenario without having to access the scenario database 240.

Figure 5:
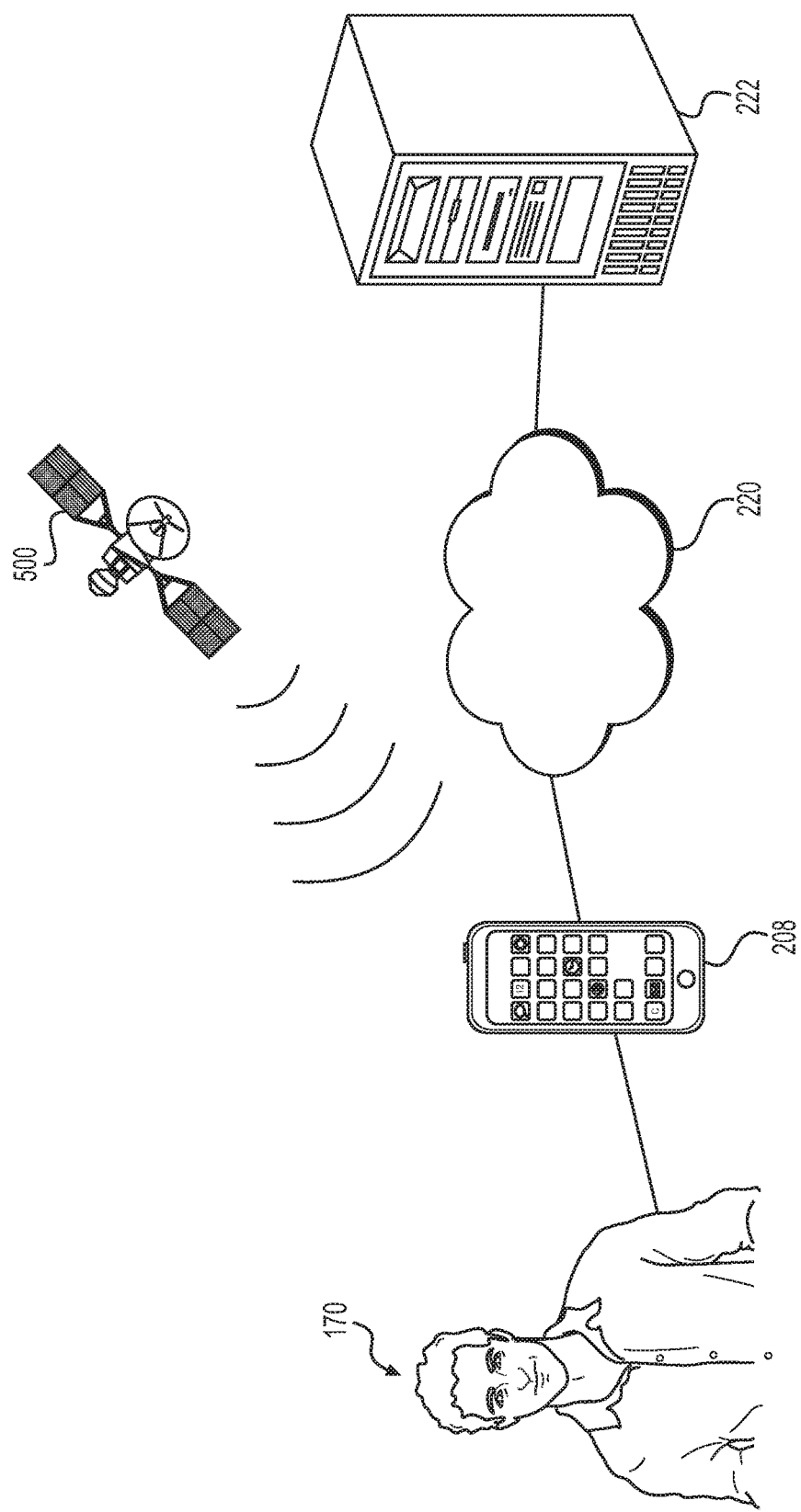
FIG. 5 is a diagram of a networked computing environment in accordance with an embodiment of the present technology.

Turning now to FIG. 5 to FIG. 9, an example of the use of the present technology is depicted. In FIG. 5, the user 170 interacts with the user device 208 to transmit a search request to the application server 222. In this example, the user device 208 is connected to the application server 222 via the network 220. In addition, the user device 208 may determine its geographical location by receiving and processing a GPS signal received from a satellite 500. The method of the exemplary scenario starts at step 600 with the user 170 selecting a scenario from a list of predefined scenario. In this example, the search query corresponds to the scenario selected by the user 170 on the user device 208. The selected scenario in this example is a "Change of Residence Location". The method proceeds to step 602 where the geographical location of the user is determined, for example, by the user device 208 on the basis of the GPS signal received from the satellite 500. Both the selected scenario "Change of Residence Location" and the geographical location are sent to the application server 222. Then, the method proceeds to step 604 where the application server 604 acquires user profile information, for example, from the user profile database 230.

At step 606, the application server 222 generates a result set comprising multiple objects. The result set comprises multiple objects that have been determined to be relevant to the user context "Change of Residence Location", each objects has been determined to be relevant by the application server 222 by (i) analysing data associated with the object (for example by analysing at least one of the fields depicted in FIG. 3); (ii) analysing the geographical location associated with the user 170; and (iii) analysing the selected scenario (for example by analysing at least one of the fields depicted in FIG. 4). The application server 222 also compiles the list of objects by ordering the objects based on one or more criteria, for example, based on a geographical proximity of each object with respect to the user 170. Then, at step 608, the method determines whether the result set is final. If the result set is not final, then the method proceeds to step 610 where the user 170 is prompted to identify a most relevant object from a list of objects. Once the user 170 has identified an object from the list of objects, then the application server 222 generates, at step 612, an updated result set comprising at least one updated object. If the result set is determined to be final, the method proceeds to step 614 where information and/or action to be associated with the result set are generated. Such information and/or action may be a map representing geographical locations associated with each object of the result set. The method then proceeds to step 616 where the result set and the associated information and/or action are displayed on the user device 208. If a change of situation, such as, for example, a change of geographical location or a change of scenario is detected at step 618, then the method proceeds to 608 to revisit whether the result set is final. If no change of situation is detected at step 618 then the connection between the user device 208 and the application server 222 may be stopped.

Figure 6:
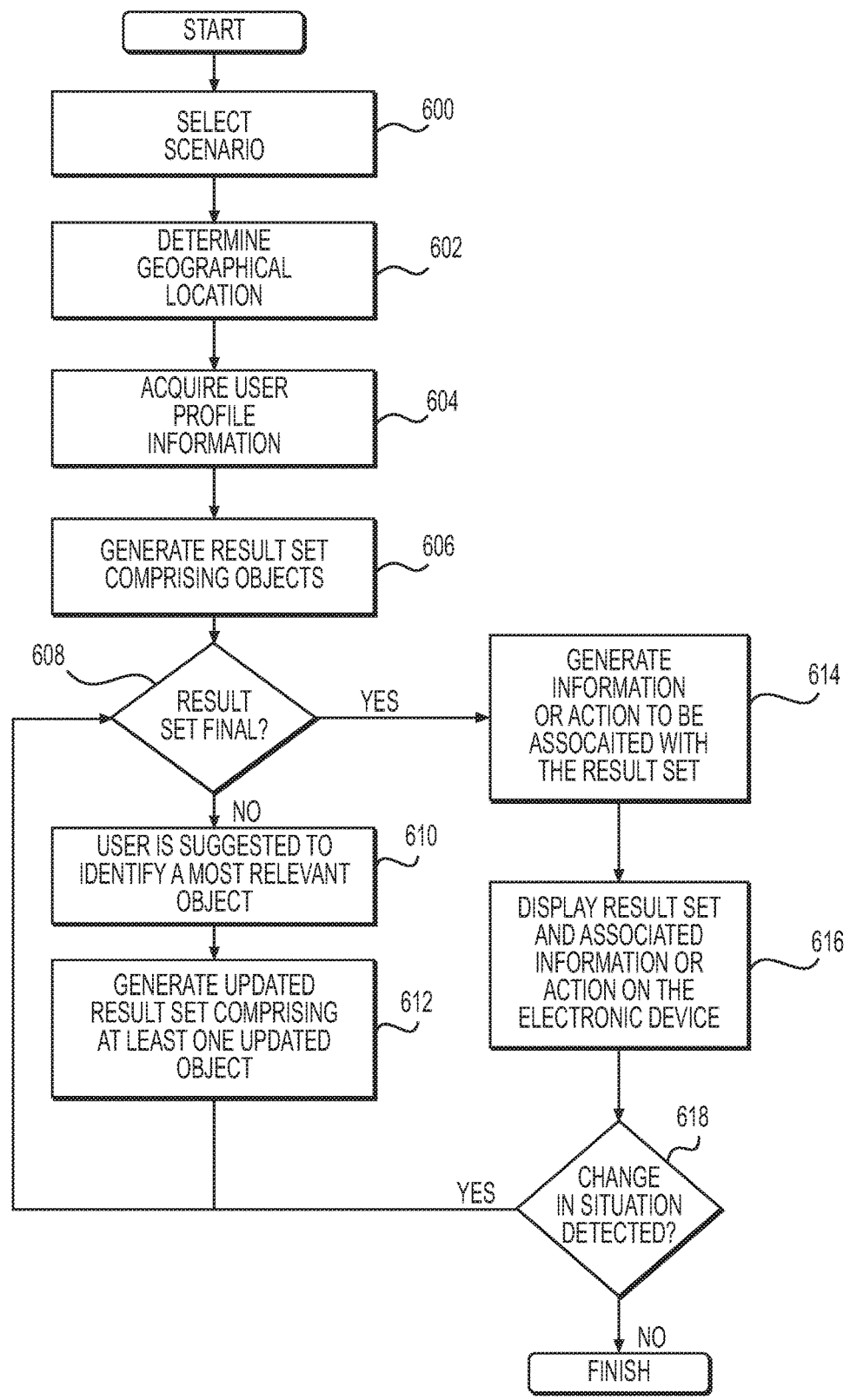
FIG. 6 is a flowchart illustrating a computer-implemented method of processing a search query to generate and display a result set to a user in accordance with an embodiment of the present technology.
Figure 7:
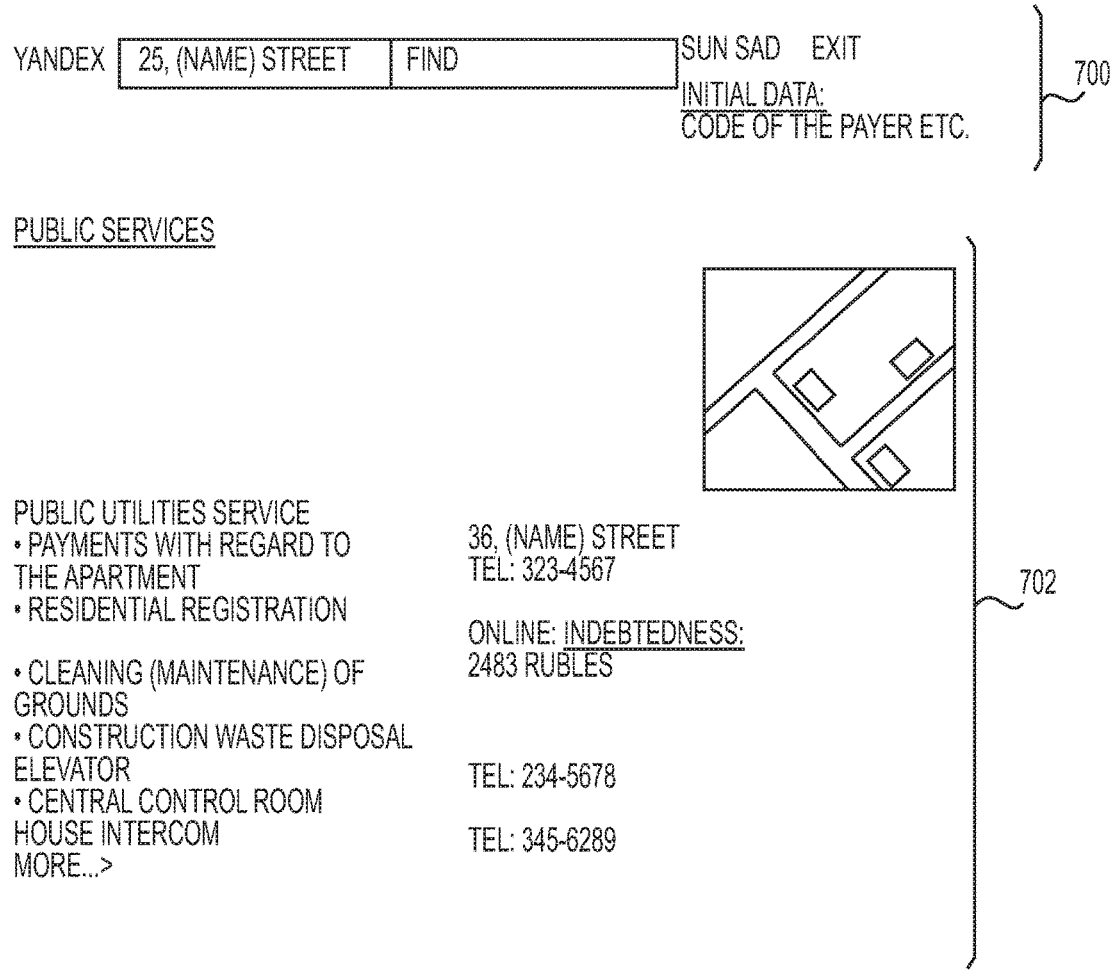
Figure 9:
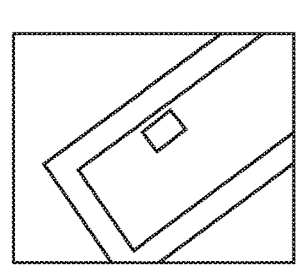

FIG. 7 to FIG. 9 show an example of multiple result sets generated in accordance with the method depicted at FIG. 6 that are displayed on the user device 208. The result sets represent group of objects that the application server 222 has determined to be relevant to the user situation "Change of Residence Location". Multiple sections are displayed on the user device 208 that are referred to as sections 700, 702, 704, 706 and 708. Section 700 shows information relating to the user profile along with generic information provided by the application server 222. Section 702 shows a group of objects entitled "Public Services". The group of objects includes a list of objects and information associated with at least some of the objects. The section 702 also comprises a map that may represent the geographical locations associated with the objects forming the group. Section 704 shows a group of objects entitled "State Bodies". Section 706 shows a group of objects entitled "Twenty-Four-Hour". Section 708 shows a group entitled "Emergency".

Figure 10:
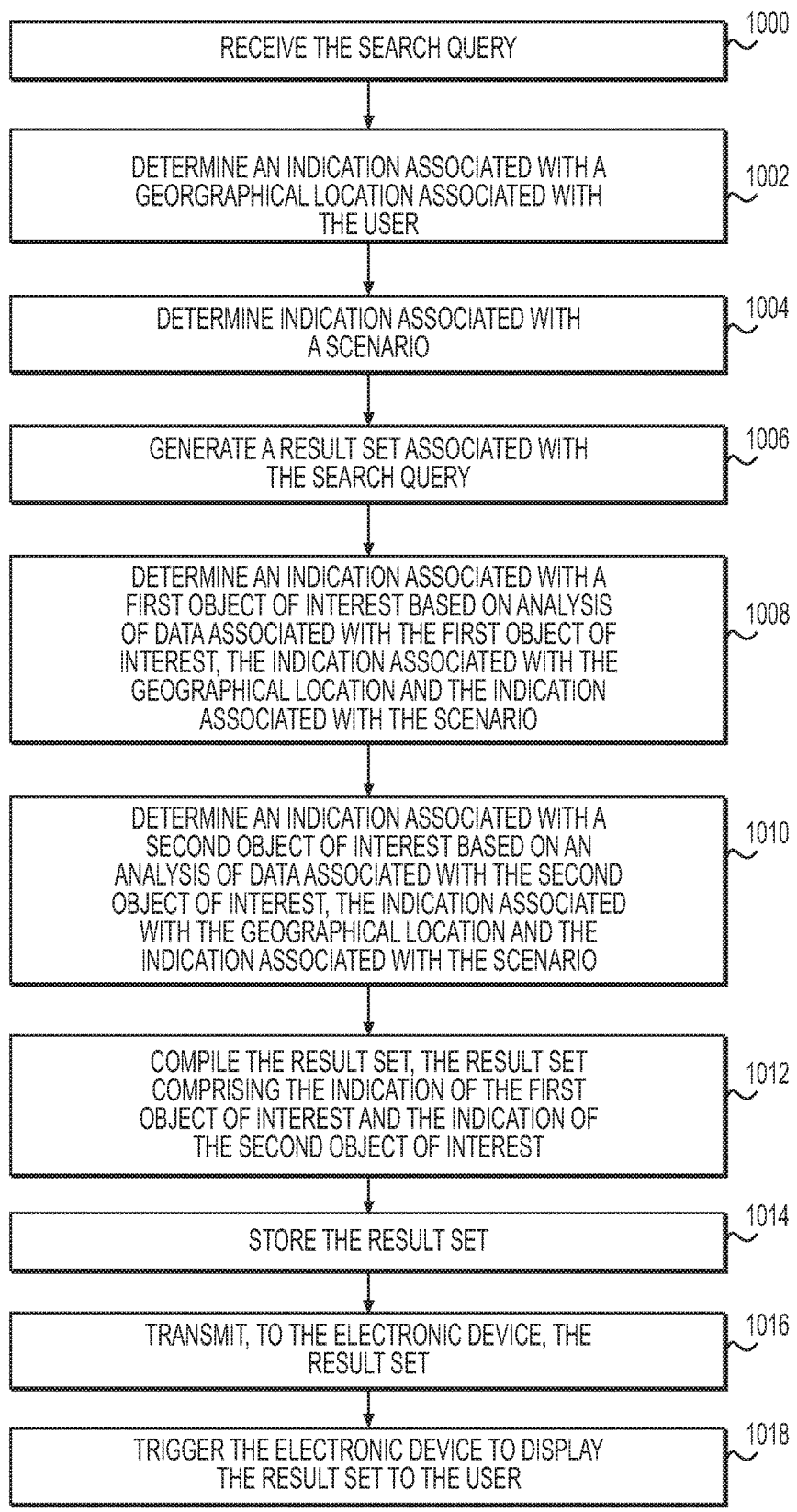
FIG. 10 is a flowchart illustrating a computer-implemented method implementing embodiments of the present technology.

Having described, with reference to FIG. 1 to FIG. 4, some non-limiting example instances of the system 200 for use in connection with the problem of processing a search query from a user and generate a result sets comprising objects of interest that are relevant to the user context or situation, we shall now describe a general solution to this problem with reference to FIG. 10.

More specifically, FIG. 10 shows a flow chart of computer-implemented method of processing a search query from a user and generate a result sets comprising objects of interest that are relevant to the user context or situation for execution on the application server 222, in accordance with an embodiment of the present technology. The computer-implemented method of FIG. 10 may comprise a computer-implemented method executable by a processor of the server 232 hosting the application server 222, the method comprising a series of steps to be carried out by the application server 222.

The computer-implemented method of FIG. 10 may be carried out, for example, in the context of the server 232 hosting the application server 222 of FIG. 2 by processors 110 executing program instructions having been loaded into random access memories 130 from solid-state drives 120 of the server 232.

At step 1000, the application server 222 may receive, from the user device 208, via the communication network a search query. The search query may be, for example, but without being limitative, a chain of characters relating to a topic, an object of interest and/or a scenario. In other examples, the search query may be generated by the user device 208 based on an interaction of the user 170 with the user device 208, for example, by allowing the user 170 to select an object of interest and/or a scenario from a list of objects of interest and/or scenarios. In other examples, the search query may be based on a vocal command from the user 170 interpreted by the user device 208. In yet other examples, the search query may be received by the application server 222 as a result of the user device 208 determining a change of a user geographical location.

At step 1002, the processor 110 of the server 232 may determine an indication associated with a geographical location associated with the user 170. The geographical location may be a current location of the user 170 or a desired location selected by the user 170. The geographical location may be automatically determined by the user device 208 or, at least partially, manually provided by the user 170 through interactions with the user device 208.

At step 1004, the processor 110 of the server 232 may determine an indication associated with a scenario, the scenario defining a sequence of events. Determination of the indication associated with the scenario may be based on an indication associated with the geographical location associated with the user 170, data associated with the user profile and retrieved from the user profile database 230, search queries retrieved from the query database 226, the search query received from the user device 208 and/or other data received from the user device 208. Determination of the indication associated with the scenario may also be based on an analysis of the received search query, an analysis of a scenario selection made by the user 170, data defining a sequence of events retrieved from the scenario database 240 and/or data retrieved from the user profile database 230. Determination of the indication associated with the scenario may also comprise the processor 110 of the server 232 selecting a sequence of events amongst a plurality of pre-established sequence of events. In some exemplary embodiments of the present technology, the data defining the sequence of events may comprise a change of residence location, an indication of an administrative procedure, an indication of a vacation trip, an indication of a business trip, an indication of a visit of an area of interest and/or an indication of a visit at an object of interest.

At step 1006 a result set associated with the search query is generated by executing steps 1008, 1010, 1012 and 1014. In some exemplary embodiments of the present technology, the step 1006 may be executed automatically by the application server 222 without requiring any input for the user 170. In some other exemplary embodiments of the present technology, the step 1008 may include prompting the user 170 to provide additional input before the result set may be generated.

At step 1008, the processor 110 of the server 232 may determine an indication associated with a first object of interest based on an analysis of data associated with the first object of interest, the indication associated with the geographical location and the indication associated with the scenario.

At step 1010, the processor 110 of the server 232 may determine an indication associated with a second object of interest, different from the first object of interest, based on an analysis of data associated with the second object of interest, the indication associated with the geographical location and the indication associated with the scenario. The data associated with the first object of interest and the data associated with the second object of interest may be retrieved from the object database 238 by the application server 222. In some exemplary embodiments, the data defining the sequence of events may be associated with the data associated with the first object of interest and the data associated with the second object of interest prior to the result set associated with the search query being generated. In some exemplary embodiments, associating the data defining the sequence of events with the indication associated with the first object of interest and the indication associated with the second object of interest is based on the data associated with the first object of interest and the data associated with the second object of interest. In yet some exemplary embodiments of the present technology, each of the data associated with the first object of interest and the data associated with the second object of interest is associated with an indication of an area of interest, an indication of a location of interest, an indication of a place of business, an indication of a place of service, an indication of a transport organization, an indication of an hour of opening, an indication of an hour of closing, an indication of an accessibility for a person with reduced mobility, an indication of a visit order, an indication of a geographical location, an indication of a transportation service and/or an indication of a cost.

At step 1012, the processor 110 of the server 232 may compile the result set, the result set comprising the indication of the first object of interest and the indication of the second object of interest. Compiling the result set may comprise executing an ordering routine to sequentially order the indication associated with the first object of interest and the indication associated with the second object of interest. The ordering routine to sequentially order the indication associated with the first object of interest and the indication associated with the second object of interest may be based on the indication associated with the geographical location associated with the user, the data defining the sequence of events, the data associated with the first object of interest, the data associated with the second object of interest, data associated with a user profile, data associated with an age of the user, data associated with a gender of the user, the search query and/or data received from the electronic device.

At step 1014, the processor 110 of the server 232 may store the result in a memory, such as, for example, the random access memories 130 of the server 232.

At step 1016, the result set is transmitted to the user device 208 and the display of the result set on the user device 208 is triggered. In an exemplary embodiment of the present technology, triggering the user device 208 to display the result set to the user 170 may comprise causing the display of the user device 208 to present a list of objects of interest and a list of actions associated with objects of interest. In such exemplary embodiment of the present technology, causing the display of the user device 208 to present the list of objects of interest and the list of actions associated with objects of interest may further comprise causing the display of the user device 208 to present the information associated with the objects of interest and information describing the actions associated with the objects of interest. In other exemplary embodiments of the present technology, triggering of the user device 208 to display the result set to the user 170 includes generating a search engine results page including the result set and/or an object card including the result set.

In some exemplary embodiments, the generation of the result set associated with the search query may further comprise determining, by the processor 110 of the server 232, the indication associated with the first object of interest, at least partially, based on a user feedback on a previously transmitted result set and/or an object of interest selected by the user 170. In yet some other exemplary embodiments, the generation of the result set associated with the search query may further comprise determining, by the processor 110 of the server 232, the indication associated with the second object of interest, at least partially, based on a user feedback on a previously transmitted result set and/or an object of interest selected by the user 170.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

One skilled in the art will appreciate when the instant description refers to "receiving data" from a user that the user device 208 or another electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of processing a search query from a user associated with an electronic device, the method executable at a server coupled to the electronic device via a communication network, the method comprising:

receiving, from the electronic device, via the communication network, the search query;

determining, by a processor of the server, an indication associated with a geographical location associated with the user;

determining, by the processor of the server, an indication associated with a scenario chosen from a plurality of scenarios, each of the scenario comprising data indicative of associated objects to the chosen scenario and defining a sequence of events;

generating a first result set and a second result set associated with the search query, the first result set grouping at least two objects of interest of a first type, the second result set grouping at least two objects of interest of a second type, the second type being different from the first type, each one of the first result set and the second result set being obtained by executing:

determining, by the processor of the server, an indication associated with a first object of interest based on an analysis of data associated with the first object of interest, the indication associated with the geographical location and the indication associated with the scenario;

determining, by the processor of the server, an indication associated with a second object of interest based on an analysis of data associated with the second object of interest, the indication associated with the geographical location and the indication associated with the scenario;

executing an ordering routine to sequentially order the indication associated with the first and second objects of interest, the ordering routine reflecting a priority of the objects of interests rather than a particular order that the user should follow in real-life;

compiling, by the processor of the server, the first and second result set, each result set comprising the indication of the first object of interest and the indication of the second object of interest;

storing, in a non-transitory computer-readable medium accessible by the server, the first result set and the second result set; and triggering the electronic device to display the first result set and the second result set to the user.

2. The method of claim 1, further comprising, prior to the triggering the electronic device to display the first result set and the second result set to the user:

transmitting, to the electronic device, via the communication network, the first result set and the second result set.

3. The method of claim 1, wherein the data associated with the first object of interest and the data associated with the second object of interest is retrieved from an object of interest database accessible by the server, the object of interest database aggregating data obtained from distinct Internet resources.

4. The method of claim 1, further comprising, prior to determining, by the processor of the server, the indication associated with the first object of interest:

aggregating data associated with the first object of interest, the data being obtained from distinct Internet resources.

5. The method of claim 1, further comprising, prior to the generating of the respective first result set and second result set associated with the search query:

associating the data defining the sequence of events with the data associated with the first object of interest and the data associated with the second object of interest.

6. The method of claim 5, wherein associating the data defining the sequence of events with the indication associated with the first object of interest and the indication associated with the second object of interest is based on the data associated with the first object of interest and the data associated with the second object of interest.

7. The method of claim 1, wherein the data defining the sequence of events comprises one of an indication of a change of residence location, an indication of an administrative procedure, an indication of a vacation trip, an indication of a business trip, an indication of a visit of an area of interest and an indication of a visit at an object of interest.

8. The method of claim 1, wherein determining the indication associated with the scenario is based on at least one of the indication associated with the geographical location associated with the user, data associated with a user profile, search queries, the search query and data received from the electronic device.

9. The method of claim 1, wherein determining the indication associated with the scenario comprises at least one of analysing the search query, analysing a scenario selection made by the user, retrieving the data defining the sequence of events from a scenario database accessible by the server and accessing data associated with a user profile from a user profile database accessible by the server.

10. The method of claim 1, wherein determining the indication associated with the scenario comprises selecting, by the processor of the server, a sequence of events amongst a plurality of pre-established sequence of events.

11. The method of claim 1, wherein the ordering routine to sequentially order the indication associated with the first object of interest and the indication associated with the second object of interest is based on at least one of the indication associated with the geographical location associated with the user, the data defining the sequence of events, the data associated with the first object of interest, the data associated with the second object of interest, data associated with a user profile, data associated with an age of the user, data associated with a gender of the user, the search query and data received from the electronic device.

12. The method of claim 1, wherein each of the data associated with the first object of interest and the data associated with the second object of interest is associated with at least one of an indication of an area of interest, an indication of a location of interest, an indication of a place of business, an indication of a place of service, an indication of a transport organization, an indication of an hour of opening, an indication of an hour of closing, an indication of an accessibility for a person with reduced mobility, an indication of a visit order, an indication of a geographical location, an indication of a transportation service and an indication of a cost.

13. The method of claim 1, wherein triggering the electronic device to display the first result set and the second result set to the user comprises causing the display of the electronic device to present one of a list of objects of interest and a list of actions associated with objects of interest.

14. The method of claim 13, wherein causing the display of the electronic device to present one of the list of objects of interest and the list of actions associated with objects of interest further comprises causing the display of the electronic device to present at least one of information associated with the objects of interest and information describing the actions associated with the objects of interest.

15. The method of claim 1, wherein the geographical location is one of a current location of the user and a desired location selected by the user.

16. The method of claim 1, wherein the search query is received as a result of the electronic device determining a change of a user geographical location.

17. The method of claim 1, wherein the triggering of the electronic device to display the first result set and the second result set to the user includes generating one of a search engine results page including the first result set and the second result set and an object card including the first result set and the second result set.

18. The method of claim 1, wherein in the generating of the first result set and the second result set associated with the search query further comprises at least one of:

determining, by the processor of the server, the indication associated with the first object of interest at least partially based on one of a user feedback on a previously transmitted result set and an object of interest selected by the user; and determining, by the processor of the server, the indication associated with the second object of interest at least partially based on one of a user feedback on a previously transmitted result set and an object of interest selected by the user.

19. A server comprising:

a communication interface for communication with an electronic device via a communication network;

a processor operationally connected with the communication interface, the processor configured to:

receive, from the electronic device, via the communication network, the search query;
determine, by a processor of the server, an indication associated with a geographical location associated with the user;
determine, by the processor of the server, an indication associated with a scenario chosen from a plurality of scenarios, each of the scenario comprising data indicative of associated objects to the chosen scenario and defining a sequence of events;
generate a first result set and a second result set associated with the search query, the first result set grouping at least two objects of interest of a first type, the second result set grouping at least two objects of interest of a second type, the second type being different from the first type, each one of the first result set and the second result set being obtained by executing:
  determine, by the processor of the server, an indication associated with a first object of interest based on an analysis of data associated with the first object of interest, the indication associated with the geographical location and the indication associated with the scenario;
  determine, by the processor of the server, an indication associated with a second object of interest based on an analysis of data associated with the second object of interest, the indication associated with the geographical location and the indication associated with the scenario;
execute an ordering routine to sequentially order the indication associated with the first and second objects of interest, the ordering routine reflecting a priority of the objects of interest rather than a particular order that the user should follow in real-life;
compile, by the processor of the server, the first result set and the second result set, the first result set and the second result set comprising the indication of the first object of interest and the indication of the second object of interest;
store, in a non-transitory computer-readable medium accessible by the server, the first result set and the second result set; and
trigger the electronic device to display the first result set and the second result set to the user.

20. The server of claim 19, the processor being further operable to, prior to trigger the electronic device to display the first result set and the second result set to the user:
transmit, to the electronic device, via the communication network, the first result set and the second result set.

* * * * *